US 8,260,974 B1

(12) United States Patent
Fredette et al.

(10) Patent No.: US 8,260,974 B1
(45) Date of Patent: Sep. 4, 2012

(54) TECHNIQUES FOR ACCELERATING THE PROCESSING OF ENCLOSURES IN SAS DISK STORAGE ARRAYS

(75) Inventors: Gary Fredette, Bellingham, MA (US); Naizhong Chiu, Newtown, MA (US); Dhaval Patel, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/978,887

(22) Filed: Dec. 27, 2010

(51) Int. Cl.
*G06F 3/00* (2006.01)
*G06F 15/173* (2006.01)
(52) U.S. Cl. .......................................... 710/8; 709/238
(58) Field of Classification Search ....... 710/8; 709/238
See application file for complete search history.

(56) References Cited

U.S. PATENT DOCUMENTS

| 7,502,669 | B1 | 3/2009 | Evans et al. | |
| 7,991,923 | B2 * | 8/2011 | Shu et al. | 710/8 |
| 2006/0010288 | A1 * | 1/2006 | Marks et al. | 711/114 |
| 2006/0020711 | A1 * | 1/2006 | Nguyen et al. | 709/238 |
| 2007/0073909 | A1 * | 3/2007 | Gasser | 710/8 |

* cited by examiner

*Primary Examiner* — Hyun Nam
(74) *Attorney, Agent, or Firm* — BainwoodHuang

(57) ABSTRACT

In a disk processor, a method includes receiving, by a first storage processor of the disk processor, an instruction to assign each enclosure of the set of disk drive enclosures an identifier, the first storage processor being disposed in electrical communication with the set of disk drive enclosures to define at least one bus, each identifier providing a distinct identity to each enclosure in the data storage system. The method includes evaluating, by the first storage processor and as part of a first batch process, the set of enclosures relative to a set of identification rules. The method includes assigning, by the first storage processor and as part of the first batch process, an identifier to each enclosure that complies with the set of identification rules. The method includes generating a fault notification for each enclosure that does not comply with at least one identification rule of the set of identification rules.

20 Claims, 4 Drawing Sheets

TECHNIQUES FOR ACCELERATING THE PROCESSING OF ENCLOSURES IN SAS DISK STORAGE ARRAYS

BACKGROUND

A typical data storage system stores and retrieves data for one or more external host devices. Such a data storage system typically includes a disk processor that includes a set of storage processors or processing circuitry and a set of disk drives. In general, the disk processor performs load and store operations on the set of disk drives on behalf of the host devices.

In certain data storage systems, the disk drives of the data storage system are distributed among one or more separate disk drive enclosures and the processing circuitry serves as a front-end to the disk drive enclosures. The disk processor presents the disk drive enclosures to a host device as a single, logical storage location and allows the host device to access the disk drives such that the individual disk drives and disk drive enclosures are transparent to the host device.

In the aforementioned data storage system, the disk processor and the disk drive enclosures are typically interconnected in a serial manner using a number of cables to provide the front end processing circuitry with access to any of the individual disk drives of the disk drive enclosures. For example, assume the data storage system is configured as Serial Attached Small Computer System Interface (SCSI) or SAS system. In this case, the data storage system includes multiple disk drive enclosures and the disk processor includes a first storage processor and a second storage processor. During an installation procedure, a user electrically couples the first storage processor to a first enclosure with a first cable, electrically couples the first enclosure to a second enclosure with a second cable, electrically couples the second enclosure to a third enclosure with a third cable, and so on until each of the disk drive enclosures in the data storage system are serially coupled to the first storage processor. The user repeats the process with respect to the second storage processor until each of the disk drive enclosures in the data storage system are serially coupled to the second storage processor.

SUMMARY

The SAS based disk drive enclosures typically require that each enclosure have an assigned identification number to uniquely identify the disk drive enclosure on a bus formed with the disk processor. In one arrangement, when the user electrically couples the disk drive enclosures to the disk processor, the disk processor is configured to execute an auto-enclosure numbering (AEN) algorithm to process the disk drive enclosures. For example, following connection of the first, second, and third disk drive enclosures to the first and second storage processors, the disk processor executes the AEN algorithm. Execution of the AEN algorithm by each of the first and second storage processors causes each of the first and second storage processors to evaluate each disk drive enclosure according to a set of rules and to assign each disk drive enclosure an identifier based upon the results of the evaluation. In one arrangement, each of the first and second storage processors evaluates the enclosures based upon a set of rules which include an online rule, a lockdown rule, a drive voting rule, a sticky enclosure rule, a replacement rule, and a new enclosure rule.

For example, during operation the first storage processor initially evaluates the first disk drive enclosure based upon the first rule (e.g., the online rule). Once completed, the second storage processor evaluates the first disk drive enclosure based upon the first rule. Next, the first storage processor evaluates the first disk drive enclosure based upon the second rule (e.g., the lockdown rule) and, once completed causes the second storage processor to evaluate the first disk drive enclosure based upon the second rule. The first and second processors continue to alternately evaluate the first disk drive enclosure according to the remaining rules while iterating through the remaining rules in a serial manner. After the first and second processors have completed the evaluation of the first disk drive enclosure, and assuming the disk drive enclosure complies with the rules, the disk processors can assign the first enclosure an identifier to identify the enclosure on the bus. Next, for the remaining second and third disk drive enclosures, the first and second storage processors execute the above described process by alternately evaluating each disk drive enclosure according to each rule of the set of rules.

Conventional SAS based arrays have a relatively small number of disk drive enclosures (e.g., 4) attached to an associated disk processor. If the number of disk drive enclosures were to increase, the above described auto-enclosure numbering the process can become relatively time consuming. For example, as indicated above, the AEN algorithm causes the first and second storage processors to apply a set of enclosure identification assignment rules to a set of disk drive enclosures in a serial manner, one enclosure at a time. Since the first and second storage processors operate in a sequential manner, the total time needed to configure all the enclosures is directly proportional to the number of disk drive enclosures. Based on a 3 second poll cycle, if the number of disk enclosures of a SAS based array were to increase, the overall time to evaluate each disk drive enclosure and assign each disk drive enclosure an identifier using the conventional AEN algorithm would increase significantly. With such an extension in the configuration time, use of the conventional AEN algorithm imposes an egregious delay in the availability of the SAS based array to the customer.

By contrast to the conventional approach, embodiments of the invention are directed to a method and apparatus for accelerating the processing of enclosures in SAS disk storage arrays. A data storage system includes a disk processor having a first and second storage processor, each storage processor having a set of bus ports (e.g., eight bus ports for each storage processor). The data storage system also includes a set of disk drive enclosures (e.g., up to 80 disk drive enclosures) electrically coupled to the first and second storage processors and distributed across the bus ports. The first and second storage processors are further configured with an auto-enclosure numbering (AEN) algorithm. When executed by each of the first and second storage processors, the AEN algorithm is configured to cause each of the first and second storage processors to process each correspondingly attached disk drive enclosure in a parallel manner. For example, during operation, the first storage processor processes the active disk drive enclosures, to which it is attached, across all buses. The first storage processor then passes configuration information and processing control to the second storage processor. Based upon the configuration information, the second storage processor then processes the active disk drive enclosures, to which it is attached, across all buses. By allowing the processing of a relatively large number of disk drive enclosures in parallel, the disk processor minimizes the amount of time required to configure a user's disk drive array. Additionally, with such a configuration, the disk processor minimizes an amount of time that the disk drive array is unavailable to a user following a data unavailability/data loss (DU/DL) event and minimizes the window where enclosure configuration changes could cause periods of system instability.

In a disk processor, one embodiment is directed to a method for assigning identifiers to a set of disk drive enclosures of a Serial Attached Small Computer System Interface (SAS) system. The method includes receiving, by a first storage processor of the disk processor, an instruction to assign each enclosure of the set of disk drive enclosures an identifier, the first storage processor being disposed in electrical communication with the set of disk drive enclosures to define at least one bus, each identifier providing a distinct identity to each enclosure in the system. The method includes evaluating, by the first storage processor and as part of a first batch process, the set of enclosures relative to a set of identification rules. The method includes assigning, by the first storage processor and as part of the first batch process, an identifier to each enclosure that complies with the set of identification rules. The method includes generating, by the first storage processor and as part of the first batch process, a fault notification for each enclosure that does not comply with at least one identification rule of the set of identification rules.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention are directed to a method and apparatus for accelerating the configuration discovery of enclosures in SAS disk storage arrays. A data storage system includes a disk processor having a first and second storage processor, each storage processor having a set of bus ports (e.g., eight bus ports for each storage processor). The data storage system also includes a set of disk drive enclosures (e.g., up to 80 disk drive enclosures) electrically coupled to the first and second storage processors and distributed across the bus ports. The first and second storage processors are further configured with an auto-enclosure numbering (AEN) algorithm. When executed by each of the first and second storage processors, the AEN algorithm is configured to cause each of the first and second storage processors to process each correspondingly attached disk drive enclosure in a parallel manner. For example, during operation, the first storage processor processes the active disk drive enclosures, to which it is attached, across all buses. The first storage processor then passes configuration information and processing control to the second storage processor. Based upon the configuration information, the second storage processor then processes the active disk drive enclosures, to which it is attached, across all buses. By allowing the processing of a relatively large number of disk drive enclosures in parallel, the disk processor minimizes the amount of time required to configure a user's SAS disk storage array. Additionally, with such a configuration, the disk processor minimizes an amount of time that the SAS storage array is unavailable to a user following a data unavailability/data loss (DU/DL) event and minimizes the window where enclosure configuration changes could cause periods of system instability.

Figure 1:
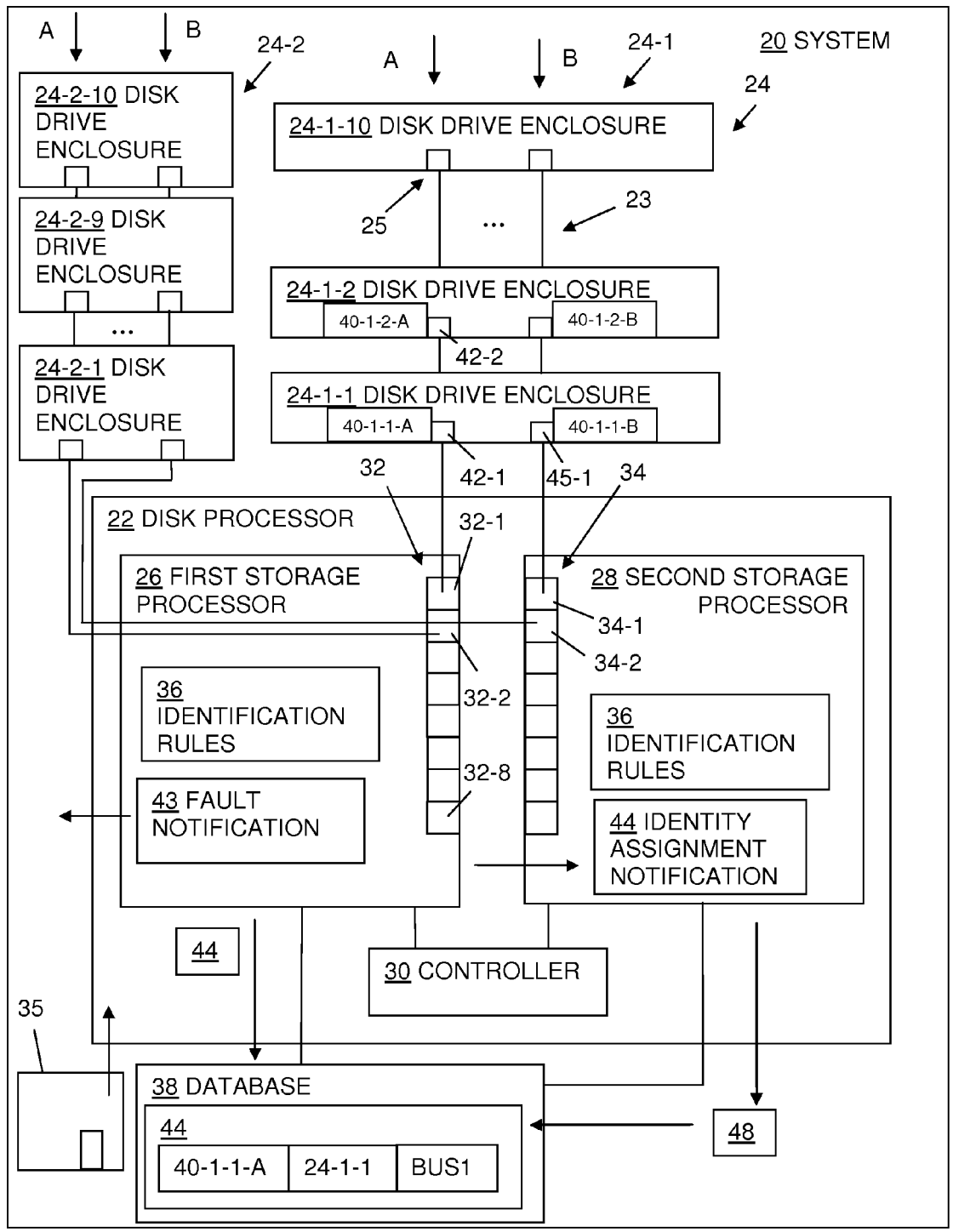
FIG. 1 illustrates a schematic representation of a data storage system, according to one embodiment of the invention.

FIG. 1 illustrates an arrangement of a data storage system 20, such as a SAS system. The data storage system 20 includes a disk processor 22 and a set of disk drive enclosures 24. The data storage system 20 is formed in a modular fashion where the disk drive enclosures 24 and the disk processor 22 are installed within a standard rack (not shown) and electrically interconnected by electrical connections, such as cables 23.

Each of the disk drive enclosures of the set of disk drive enclosures 24 includes an array of memory units, such as tape drives or disk drives. For example, each of the disk drive enclosures 24 includes several disk drives operable to store data received from, or to provide data requested from, a host device (not shown). Each of the disk drive enclosures 24 includes ports 25 that provide interconnection among the set of disk drive enclosures 24 and with the disk processor 22 via cables 23. In one arrangement, the set of disk drive enclosures 24 are configured as Serial Attached Storage (SAS) enclosures that attach to each other in a serial manner.

The disk processor 22 includes a first storage processor 26, a second storage processor 28, and a controller 30, such as a memory and a processor, disposed in electrical communication with the first and second storage processors 26, 28.

The first storage processor 26, such as a memory and a processor, includes a set of bus ports 32 configured to electrically couple to the set of disk drive enclosures 24 via cables 23. While the first storage processor 26 can include any number of bus ports 32, in one arrangement, the first storage processor includes a set of eight bus ports 32-1 through 32-8. Each bus port of the set of bus ports 32 defines a bus when connected to subsets of the set of disk drive enclosures 24. For example, the first bus port 32-1 of the first storage processor 26 is electrically coupled to a first subset of disk drive enclosures 24-1, such as a subset of up to ten disk drive enclosures 24-1-1 through 24-1-10, along loop A to define a first bus. Also as shown, the second bus port 32-2 of the first storage processor 26 is electrically coupled to a second set of disk drive enclosures 24-2, such as a subset of up to ten disk drive enclosures 24-2-1 through 24-2-10, along loop A to define a second bus. While only two subsets of disk drive enclosures, namely the first and second subsets of disk drive enclosures 24-1, 24-2, it should be understood that, in the arrangement show, up to eight subsets of disk drive enclosures can be attached to the bus ports 32.

The second storage processor 28, such as a memory and a processor, includes a set of bus ports 34 configured to electrically couple to the set of disk drive enclosures 24 via cables 23. While the second storage processor 28 can include any number of bus ports 34, in one arrangement, the second storage processor includes a set of eight bus ports 34-1 through 34-8. Each bus port of the set of bus ports 34 defines a bus when connected to subsets of the set of disk drive enclosures 24. For example, the first bus port 34-1 of the second storage processor 26 is electrically coupled to a first subset of disk drive enclosures 24-1 along loop B to define a first bus. Also as shown, the second bus port 34-2 of the second storage processor 26 is electrically coupled to a second set of disk drive enclosures 24-2 along loop B to define a second bus. While only two subsets of disk drive enclosures, namely the first and second subsets of disk drive enclosures 24-1, 24-2, it should be understood that, in the arrangement show, up to eight subsets of disk drive enclosures can be attached to the bus ports 34.

The first and second storage processors 26, 28 are configured to control certain functions of the data storage system 20. For example, the each storage processor 26, 28 is configured to perform load and store operations on storage devices carried by the disk drive enclosures 24 on behalf of a host device (not shown). Additionally, the first and second storage processors 26, 28 are configured to evaluate each correspondingly attached disk drive enclosure of the set of disk drive enclosures 24, and if applicable assign the disk drive enclosures 24 an identifier, in a parallel manner, as will be described in detail below.

Each of the first and second storage processors 26, 28 are configured with a set of identification rules 36 which the first and second storage processors 26, 28 utilize to evaluate the set of disk drive enclosures 24, and if applicable, assign the disk drive enclosures 24 an identifier or address. While a variety of identification rules 36 can be utilized, in one arrangement, each of the first and second storage processors 26, 28 iterates through a series of six rules to evaluate the disk drive enclosures 24.

Taking the first storage processor 26 as an example, during operation, the first storage processor 26 evaluates the disk drive enclosures, such as disk drive enclosures 24-1-1 through 24-1-10, on a bus, such as the bus associated with bus port 32-1 with respect to first or an online rule. When applying the online rule, for all the disk drive enclosures 24-1-1 through 24-1-10 on a particular bus if the first storage processor 26 detects that a disk drive enclosure is already online (e.g., it is currently in use by a disk drive enclosure associated with the second storage processor 28), the first storage processor 26 assign the disk drive enclosure its current disk drive enclosure identifier.

Next, for all the disk drive enclosures 24-1-1 through 24-1-10 on the bus associated with bus port 32-1 which were not assigned disk drive enclosure number under the first rule, the first storage processor 26 applies a second or lockdown rule. When applying the lockdown rule, if a disk drive enclosure's unique identifier (UID) is stored in a database 38 and there is at least one voting drive associated with that disk drive enclosure that agrees with the corresponding disk drive enclosure identifier in the database 38, the first storage processor 26 assigns the disk drive enclosure that disk drive enclosure identifier.

Next, for all the disk drive enclosures 24-1-1 through 24-1-10 on the bus associated with bus port 32-1 which were not assigned disk drive enclosure number under the first and second rules, the first storage processor 26 applies a third or drive voting rule. Each disk drive enclosure includes a set of disk drives. When applying the rule, if a majority of the disk drives vote for a disk drive enclosure identifier of the first storage processor 26 then assigns the disk drive enclosure the disk drive enclosure identifier selected by the voting disk drives.

Next, for all the disk drive enclosures 24-1-1 through 24-1-10 on the bus associated with bus port 32-1 which were not assigned disk drive enclosure number under the first, second, or third rules, the first storage processor 26 applies a fourth or sticky enclosure rule. For example, the first storage processor 26 detects whether each disk drive enclosure for the bus has an identifier (UID) already stored in the database 38. In response to detecting a disk drive enclosure as having an identifier stored in the database 38, the first storage processor 26 assigns the disk drive enclosure the corresponding identifier from the database, provided the identifier does not conflict an identifier assigned to the other disk drive enclosures with the first, second, or third rules. Application of this rule allows a disk drive enclosure to change position along a single bus.

Next, for all the disk drive enclosures 24-1-1 through 24-1-10 on the bus associated with bus port 32-1 which were not assigned disk drive enclosure number under the first through fourth rules, the first storage processor 26 applies a fifth or replacement rule. For example, for the bus associated with bus port 32-1, the first storage processor 26 assigns disk drive enclosure identifiers from a set of previously assigned but currently missing disk drive enclosures (e.g., disk drive enclosures with voting drives that are not currently online but used to be). Lastly, for all the disk drive enclosures 24-1-1 through 24-1-10 on the bus which were not assigned an identifier by any of the prior rules, the first storage processor 26 applies a sixth or new enclosure rule to assign a new enclosure identifier to the disk drive enclosure.

The first and second storage processors 26, 28, each store an AEN algorithm or application for processing the attached disk drive enclosures 24 in a parallel manner. The AEN application installs on the first and second storage processors 26, 28 from a computer program product 35. In some arrangements, the computer program product 35 is available in a standard off-the-shelf form such as a shrink wrap package (e.g., CD-ROMs, diskettes, tapes, etc.). In other arrangements, the computer program product 35 is available in a different form, such downloadable online media. When performed on the first and second storage processors 26, 28 of the disk processor 22, the AEN application causes the first and second storage processors 26, 28 to evaluate each correspondingly attached disk drive enclosure of the set of disk drive enclosures 24, and if applicable assign the disk drive enclosures 24 an identifier, in a parallel manner.

Figure 2:
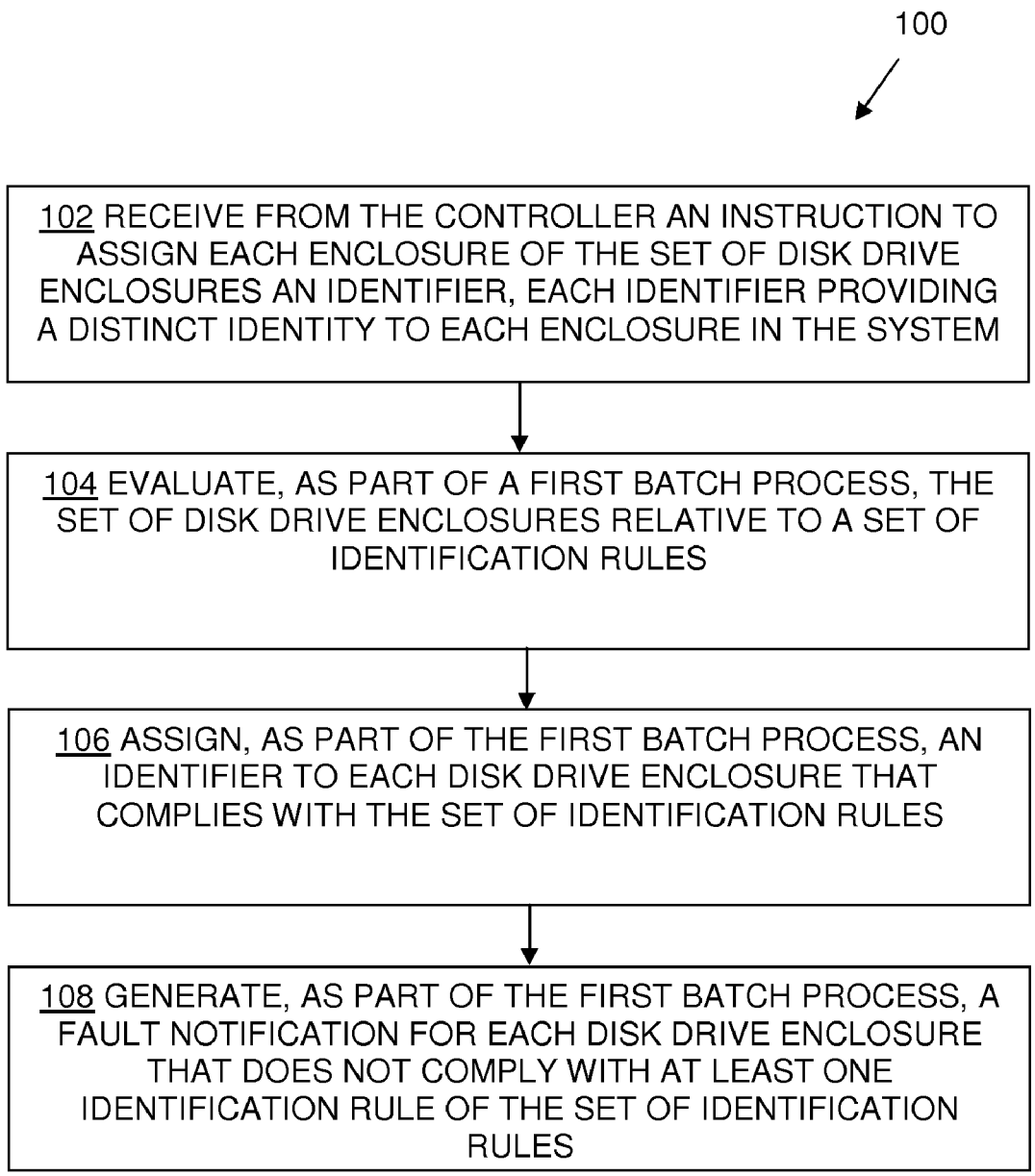
FIG. 2 is a flowchart that illustrates a procedure performed by the data storage system of FIG. 1, according to one embodiment of the invention.

Each disk drive enclosure requires an address or identifier to uniquely identify the disk drive enclosure on the bus formed with the disk processor 22. FIG. 2 is a flowchart 100 that illustrates a procedure performed by the disk processor 22 for detecting and, if applicable, assigning identifiers to the set of disk drive enclosures 24.

In step 102, the first storage processor 26 receives, from the controller 30, an instruction to assign each enclosure of the set of disk drive enclosures 24 an identifier, each identifier providing a distinct identity to each enclosure in the system 20. With reference to FIG. 1, assume the case where loop A and loop B of the disk drive enclosures 24-1-1 through 24-1-10 are electrically coupled to the first bus ports 32-1, 34-1 of the first and second storage processors 26, 28, respectively. Further assume that loop A and loop B of the disk drive enclosures 24-2-1 through 24-2-10 are electrically coupled to the second bus ports 32-2, 34-2 of the first and second storage processors 26, 28, respectively. In response to an activation event, such as the set of disk drive enclosures 24 being booted for the first time, the first and second storage processors 26, 28 compete to be the first processor to configure the set of disk drive enclosures 24. For example, the controller 30 allows either of the first or second storage processor 26, 28 to process the disk drive enclosures 24 first, depending upon which of the first and second storage processors 26, 28 is first to transmit a request to the controller 30. In this example, assume the first storage processor 26 is the first to transmit the request and is granted permission by the controller 30 to process the disk drive enclosures 24.

Returning to FIG. 2, in step 104, the first storage processor 26 evaluates, as part of a first batch process, the set of disk drive enclosures 24 relative to a set of identification rules 36. In one arrangement, with reference to FIG. 1, after having been granted permission to process the set of disk drive enclosures 24, the first storage processor 26 executes the AEN application and initially detects the presence of active disk drive enclosures across all of the busses. For example, assume that disk drive enclosure 24-2-10 is offline, and therefore unavailable, and that disk drive enclosures 24-1-1 through 24-1-10 and disk drive enclosures 24-2-1 through 24-2-9 are online and available. In this case, in response to transmitting an availability signal to set of disk drive enclosures 24 dispose in electrical communication with the first and second bus ports 32-1, 32-2, the first storage processor 26 detects the availability of disk drive enclosures 24-1-1 through 24-1-10 and disk drive enclosures 24-2-1 through 24-2-9.

Following detection of the active disk drive enclosures, the first storage processor 26 then applies the identification rules 36, described above, to disk drive enclosures 24-1-1 through 24-1-10 and disk drive enclosures 24-2-1 through 24-2-9 as part of a batch process during a single time slice. For example, during the batch process, the first storage processor 26 applies the identification rules 36 to all of the disk drive enclosures 24-1-1 through 24-1-10 and disk drive enclosures 24-2-1 through 24-2-9 on both bus ports 32-1, 32-2 without interruption by the second storage processor 28.

Returning to FIG. 2, in step 106, the first storage processor 26 assigns, as part of the first batch process, an identifier 40 to each disk drive enclosure that complies with the set of identification rules 36. For example, with reference to the first subset of disk enclosures 24-1 of FIG. 1, the first disk processor 24 applies the above-referenced identification rules 36 to the first disk drive enclosure 24-1-1 in a serial manner. In the case where the first disk drive enclosure 24-1-1 complies with one of identification rules 26, the first disk processor 24 provides an identifier 40-1-1-A, such as a number or an address selected from an address pool, to uniquely identify the disk drive enclosure 24-1-1 on the bus formed with the first bus port 32-1 along loop A. For example, the first storage processor 26 stores the identifier 40-1-1-A in a memory of port 42-1 associated with loop A of the disk drive enclosure 24-1-1. With such storage, the first storage processor 26 allows the disk drive enclosure 24-1-1 to be available for use (i.e., online). The first storage processor 26 then processes the remaining active disk drive enclosures 24-1-2 through 24-1-10 along the first bus and active disk drive enclosures 24-2-1 through 24-2-9 in the same manner.

Returning to FIG. 2, in step 108, the first storage processor 26 generates, as part of the first batch process, a fault notification 43 for each disk drive enclosure that does not comply with at least one identification rule of the set of identification rules. For example, as shown in FIG. 1, in the case where the first disk drive enclosure 24-1-1 does not comply (e.g., fails) with all of identification rules 26, rather than make the disk drive enclosure 24-1-1 available for use, the first disk processor 26 marks the disk drive enclosure 24-1-1 and transmits, as part of the fault notification 43, a fault symptom to an end user. In one arrangement, in the case where the first disk drive enclosure 24-1-1 does not comply with all of identification rules 26, the faulted first disk drive enclosure 24-1-1 and all disk drive enclosures 24-1-2 through 24-1-10 downstream from the faulted disk drive enclosure 24-1-1 go offline. Based upon the fault symptom, the end user can diagnose and correct the fault to allow the disk drive enclosure 24-1-1 to be later assigned an identifier and placed online.

In one arrangement, following processing of the set of disk drive enclosures 24 attached to the bus ports 32, the first storage processor 26 stores an association between each identifier 40 and each corresponding disk drive enclosure in the database 38 as part of a storage batch process, for later access by an end user. For example, as shown in FIG. 1, the first storage processor 26 generates an identity assignment notification 44 having a table that includes each assigned address 40, an indication of the corresponding disk drive enclosure 24 (e.g., a serial number of the disk drive enclosure), and an indication of the bus to which the enclosure belongs, such as BUS1. By writing the identity assignment notification 44 to the database 38 as a batch procedure for all disk drive enclosures 24 across all bus ports 32, and without interruption from the second storage processor 28, the first storage processor minimizes the amount of time typically required in conventional data storage systems to store such information.

Once the first storage processor 26 completes the evaluation process, the first storage processor 26 notifies the second storage processor 28 to allow the second storage processor to execute the AEN application and process the subsets of disk drive enclosures 24-1, 24-2 electrically coupled to the first and second bus ports 34-1, 34-2. For example, the first storage processor transmits the identity assignment notification 44 to the second storage processor 28. The second storage processor 28, in turn, reviews the identity assignment notification 44 to detect the associations between the assigned address 40 and the corresponding disk drive enclosure 24 on loop A of each bus as well as to detect the state of the disk drive enclosures on loop A (e.g., functional, faulted, etc). With this information, the second storage processor 28 further batch processes all of the active disk drive enclosures 24-1-1 through 24-1-10 associated with the first bus port 34-1 and the active disk drive enclosures 24-2-1 through 24-2-9 associated with the second bus port 34-2, the second storage processor 28 to potentially place the disk drive enclosures online while using the same identifier 40 used by the first storage processor 26.

For example, during operation and in conjunction with having reviewed the identity assignment notification 44, the second storage processor 28 applies the identification rules 36, described above, to disk drive enclosures 24-1-1 through 24-1-10 and disk drive enclosures 24-2-1 through 24-2-9 as part of a second batch process, (i.e., distinct from the first batch process utilized by the first storage processor 26). Based upon the application of the identification rules 36, the second storage processor 28 assigns, as part of the second batch process, the corresponding identifier 40, as indicated in the identity assignment notification 44, to each disk drive enclosure that complies with the set of identification rules 36. For example, with reference to the first subset of disk enclosures 24-1 of FIG. 1, the second disk processor 28 applies the above-referenced identification rules 36 to the first disk drive enclosure 24-1-1 in a serial manner. In the case where the first disk drive enclosure 24-1-1 complies with one of identification rules 26, the second disk processor 28 provides an identifier 40-1-1-B, such as indicated in the identity assignment notification 44, to uniquely identify the disk drive enclosure 24-1-1 on the bus formed with the first bus port 34-1 along loop B. For example, the second storage processor 28 stores the identifier 40-1-1-B in a memory of port 45-1 associated with loop B of the disk drive enclosure 24-1-1.

With such storage, the second storage processor 28 allows the disk drive enclosure 24-1-1 to be available for use (i.e., online) as long as the disk drive enclosure 24-1-1 does not violate any of the other conditions, such as caused by miscabling of the disk drive enclosures 24-1-1 through 24-1-10 (e.g., errors in connecting the disk drive enclosures 24-1-1 through 24-1-10 together via cables 23). The second storage processor 28 then processes the remaining active disk drive enclosures 24-1-2 through 24-1-10 along and active disk drive enclosures 24-2-1 through 24-2-9 in the same manner. The second storage processor 28 is configured to also generate, as part of the second batch process, a fault notification 43 for each disk drive enclosure that does not comply with at least one identification rule of the set of identification rules. In one arrangement, following processing of the set of disk drive enclosures 24 attached to the bus ports 34, the second storage processor 28 stores an association between each identifier 40 and each corresponding disk drive enclosure as an identity assignment notification 48 in the database 38, for later access by an end user.

By allowing the processing of a relatively large number of disk drive enclosures 25 by a first and second storage processor 26, 28 as part of separate batch processes (e.g., in parallel), the disk processor 22 minimizes the amount of time required to configure an enterprise's disk drive array, as compared to conventional serial processing. For example, assume the data storage system 20 includes a total of sixty-four disk drive enclosures 24 distributed equally across eight buses, such that each bus port of the first and second storage processors 26, 28 are electrically coupled to eight disk drive enclosures 24. Each disk drive enclosure 24 contains fifteen disk drives. Assume the case where the first and second storage processors 26, 28 are power cycled while the disk drive enclosures remain in a powered-on state. In the case where the first storage processor 26 is selected to process the disk drive enclosures 24 first, the first storage processor 26 can configure all sixty-four disk drive enclosures 24 with a total of 960 disk drives and place them online in about 5 seconds. Then, the second storage processor 28 processes the disk drive enclosures 24, also within about 5 seconds. Accordingly, in a total time of about 10 seconds, the first and second storage processors 26, 28 can process all sixty-four enclosures with the 960 drives.

As indicated above, the first and second storage processors 26, 28 include multiple bus ports 32, 34 that allow multiple busses (e.g., up to eight busses per storage processor) to be established with the disk drive enclosures 24. With the presence of multiple busses, it is possible for an end user to physically move a disk drive enclosure from one bus to another bus. However, assume the case where a disk drive enclosure is moved from a first bus to a second bus with one or more disk drive of the enclosure storing data. When a storage processor places the moved disk drive enclosure on-line, in such a case, incoming write commands can overwrite the existing data on the disks.

Figure 3:
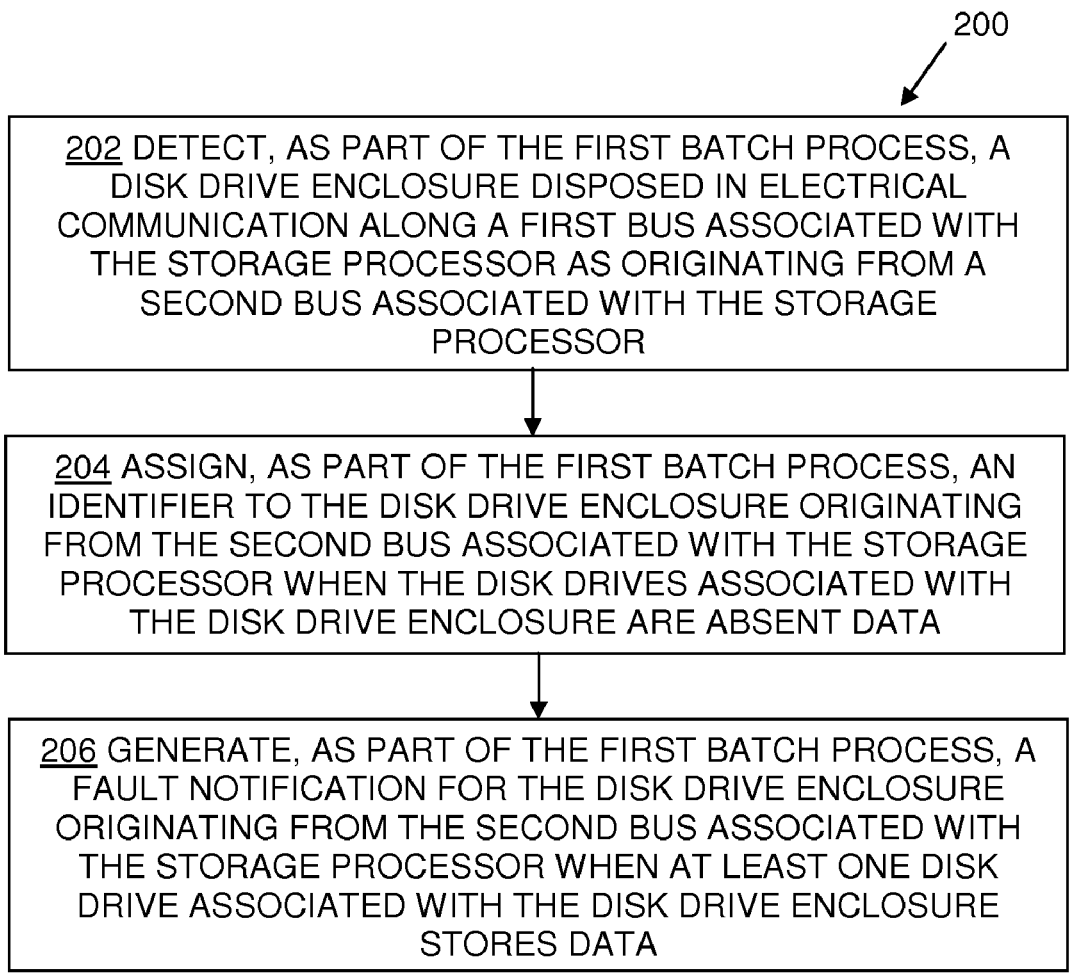
FIG. 3 is a flowchart that illustrates a procedure performed by the data storage system of FIG. 1, according to one embodiment of the invention.

FIG. 3 is a flowchart 200 that illustrates a procedure performed by the disk processor when detecting if a disk drive enclosure has been moved from a first bus to a second bus. Such a procedure can minimize overwriting of data when a disk drive enclosure 24 is physically moved or re-cabled from a first bus to a second bus.

Figure 4:
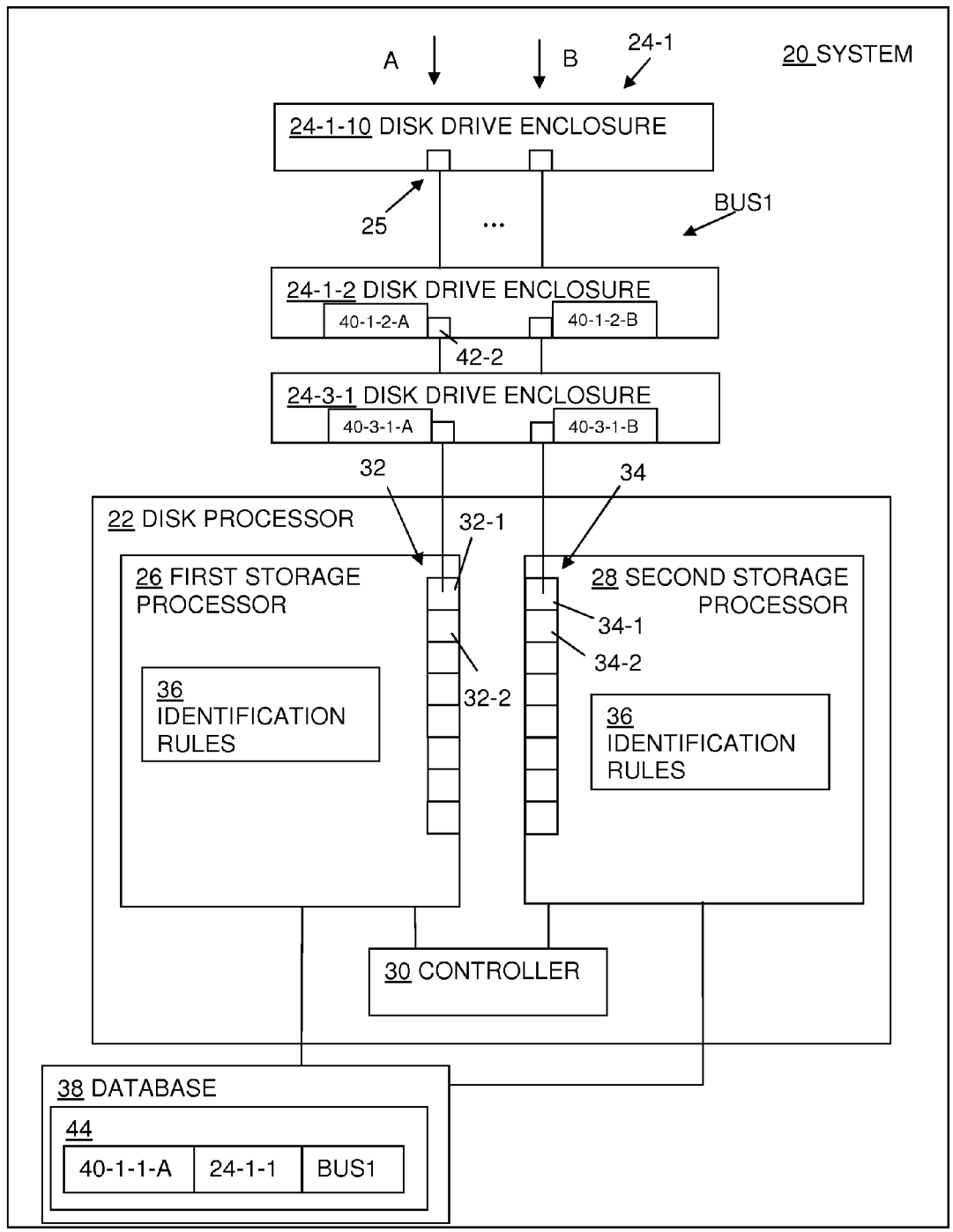
FIG. 4 illustrates a schematic representation of a data storage system, according to one embodiment of the invention.

In step 202, a first storage 26 processor detects a disk drive enclosure 24 disposed in electrical communication along a first bus associated with the storage processor 26 as originating from a second bus associated with the storage processor 26. In one arrangement, with reference to FIG. 4, the first storage processor 26 forms a first bus BUS1 with a first subset of disk drive enclosures 24-1. Prior to placing the disk drive enclosures on-line, the first storage processor 26 compares an identifier 40 associated with the each disk drive enclosure on BUS1 with an identifier 40 of each disk drive enclosure 24 stored in the database 38 to detect the origin of the disk drive enclosure 24 relative to the available busses. For example, as illustrated, the database 38 indicates that, with respect to the first storage processor 26, the first disk drive enclosure 24-1-1 on BUS1 has an identifier 40-1-1-A. However, as a result of comparing the identifier 40-1-1-A entry from the database 38 with the identifier 40-3-1-A associated with the disk drive enclosure 24-2-1 on BUS1, the first storage processor 26 can detect a mismatch between identifiers 40. Such a mismatch is indicative of the disk drive enclosure 24-3-1 having been moved from a third bus, BUS3 (not shown), to the first bus BUS1.

Returning to FIG. 3, in step 204, the first storage processor 26 assigns an identifier to the disk drive enclosure 24-2-1 originating from the second bus associated with the storage processor 26 when the disk drives associated with the disk drive enclosure are absent data. For example, if the disk drives carried by the disk drive enclosure 24-2-1 do not contain data (i.e., are blank) overwriting the disk drives with new data is appropriate. Accordingly, by assigning a new identifier to the first disk drive enclosure 24-2-1, the first storage processor 26 allows the disk drive enclosure 24-2-1 to be identified and utilized within the storage system 20.

In step 206, the first storage processor generates a fault notification 43 for the disk drive enclosure 24-2-1 originating from the second bus associated with the storage processor 26 when at least one disk drive associated with the disk drive enclosure 24-2-1 stores data. For example, if the disk drive enclosure 24-2-1 includes a voting or bound disk drive that contains data, overwriting the disk drive with new data is inappropriate.

Accordingly, rather than placing the disk drive enclosure 24-2-1 on-line, by generating and transmitting a fault notification 43, the first storage processor 26 provides an end user with the ability to move or re-cable the disk drive enclosure 24-2-1 while maintaining the integrity of the data stores on the disk drives.

While various embodiments of the invention have been particularly shown and described, it will be understood by those skilled in the art that various changes in form and details may be made therein without departing from the spirit and scope of the invention as defined by the appended claims.

For example, as described above, the first and second storage processors 26, 28 each include eight bus ports 32, 34, respectively, to define eight busses with the set of storage processors 24. Such description is by way of example only. In one arrangement, the first and second storage processors 26, 28 can be configured with any number of bus ports. Also as described above, each subset of disk drive enclosures 24 includes a total of ten disk drive enclosures 24. Such description is by way of example only. In one arrangement, each subset of disk drive enclosures 24 can include any number of disk drive enclosures 24.

What is claimed is:

1. In a disk processor, a method for processing a set of disk drive enclosures of a Serial Attached Small Computer System Interface (SAS) system, comprising:
   receiving, by a first storage processor of the disk processor, an instruction to assign each disk drive enclosure of the set of disk drive enclosures an identifier, the first storage processor being disposed in electrical communication with the set of disk drive enclosures to define at least one bus, each identifier providing a distinct identity to each disk drive enclosure in the system;
   evaluating, by the first storage processor and as part of a first batch process, the set of disk drive enclosures relative to a set of identification rules;
   assigning, by the first storage processor and as part of the first batch process, an identifier to each disk drive enclosure that complies with the set of identification rules, and generating, by the first storage processor and as part of the first batch process, a fault notification for each disk drive enclosure that does not comply with at least on identification rule of the set of identification rules, wherein the first storage processor defines a set of bus ports, each bus port disposed in electrical communication with a subset of the set of disk drive enclosures, each bus port of the first storage processor and the subset of the set of disk drive enclosures disposed in electrical communication with each corresponding bus port defining a bus.

2. The method of claim 1, wherein following assigning of the identifiers to each disk drive enclosure that complies with the set of identification rules, storing, by the first storage processor and as part of a storage batch process, each identifier together with an indication of each corresponding disk drive enclosure in a database.

3. The method of claim 1, comprising:
receiving, by a second storage processor of the disk processor, an identity assignment notification from the first storage processor, the identity assignment notification indicating each identifier together with an indication of each corresponding disk drive enclosure, the second storage processor being disposed in electrical communication with the set of disk drive enclosures to define the at least one bus;
evaluating, by a second storage processor of the disk processor, the identity assignment notification to detect a state of the disk drive enclosures;
evaluating, by the second storage processor and as part of a second batch process, the set of disk drive enclosures identified in the identity assignment notification relative to the set of identification rules;
assigning, by the second storage processor and as part of the second batch process, the corresponding identifier, as indicated in the identity assignment notification, to each disk drive enclosure that complies with the set of identification rules; and
generating, by the second storage processor and as part of the second batch process, a fault notification for each disk drive enclosure that does not comply with at least one identification rule of the set of identification rules.

4. The method of claim 3, wherein following assigning of the identifiers to each disk drive enclosure that complies with the set of identification rules, storing, by the second storage processor and as part of a storage batch process, each identifier together with an indication of each corresponding disk drive enclosure in a database.

5. The method of claim 3, further comprising beginning execution of the second batch process only after the first batch process has completed.

6. The method of claim 3, further comprising:
detecting a disk drive enclosure disposed in electrical communication along a first bus of the first storage processor;
comparing an identifier of the dedicated disk drive enclosure with an identifier of each disk drive enclosure on the first bus to detect a mismatch between identifiers, the mismatch indicating that the disk drive enclosure has been moved to the first bus from another bus.

7. The method of claim 1 wherein, evaluating the set of disk drive enclosures relative to the set of identification rules comprises evaluating, by the first storage processor and as part of the first batch process, active disk drive enclosures of the set of disk drive enclosures relative to the set of identification rules.

8. The method of claim 1, wherein the second storage processor defines a set of bus ports, each bus port disposed in electrical communication with a subset of the set of disk drive enclosures, each bus port of the second storage processor and the subset of the set of disk drive enclosures disposed in electrical communication with each corresponding bus port defining a bus.

9. The method of claim 1, wherein the instruction received by the first storage processor to assign each disk drive enclosure an identifier is issued by a controller, wherein the controller is coupled to the first storage processor and the second storage processor, and wherein the method further comprises the controller allowing one of the first storage processor or the second storage processor to process disk drive enclosures first, depending on which of the first and second storage processors is first to transmit a request to the controller.

10. The method of claim 1, further comprising the first storage processor storing the identifier or a disk drive enclosure in memory of a port of the disk drive enclosure.

11. The method of claim 1, further comprising, after generating a fault notification for a disk drive enclosure that does not comply with at least one identification rule, transmitting a fault symptom to an end user to provide an opportunity for the end user to diagnose and correct a fault.

12. In a disk processor, a method for processing a set of disk drive enclosures of a Serial Attached Small Computer System Interface (SAS) system, comprising:
receiving, by a first storage processor of the disk processor, an instruction to assign each disk drive enclosure of the set of disk drive enclosures an identifier, the first storage processor being disposed in electrical communication with the set of disk drive enclosures to define at least one bus, each identifier providing a distinct identity to each disk drive enclosure in the system;
evaluating, by the first storage processor and as part of a first batch process, the set of disk drive enclosures relative to a set of identification rules;
assigning, by the first storage processor and as part of the first batch process, an identifier to each disk drive enclosure that complies with the set of identification rules; and
generating, by the first storage processor and as part of the first batch process, a fault notification for each disk drive enclosure that does not comply with at least one identification rule of the set of identification rules,
wherein:
evaluating the set of disk drive enclosures relative to a set of identification rules comprises detecting, by the first storage processor and as part of the first batch process, a disk drive enclosure disposed in electrical communication along a first bus of the storage processor as originating from a second bus of the storage processor;
assigning the identifier to each disk drive enclosure that complies with the set of identification rules comprises assigning, by the first storage processor and as part of the first batch process, an identifier to the disk drive enclosure originating from the second bus of the storage processor when the disk drives of the disk drive enclosure are absent data; and
generating a fault notification for each disk drive enclosure that does not comply with at least one identification rule of the set of identification rules comprises generating, by the first storage processor and as part of the first batch process, a fault notification for the disk drive enclosure originating from the second bus of the storage processor when at least one disk drive of the disk drive enclosure stores data.

13. A disk processor, comprising:
a controller; and
a first storage processor disposed in electrical communication with the controller and disposed in electrical communication with a set of disk drive enclosures of a Serial Attached Small Computer System Interface (SAS) system to define at least one bus, the first storage processor configured to:
  receive from the controller an instruction to assign each disk drive enclosure of the set of disk drive enclosures an identifier, each identifier providing a distinct identity to each disk drive enclosure in the system;
  evaluate, as part of a first batch process, the set of disk drive enclosures relative to a set of identification rules;
  assign, as part of the first batch process, an identifier to each disk drive enclosure that complies with the set of identification rules; and
  generate, as part of the first batch process, a fault notification for each disk drive enclosure that does not comply with at least one identification rule of the set of identification rules; and
a second storage processor disposed in electrical communication with the set of disk drive enclosures to define the at least one bus, the second storage processor configured to:
  receive an identity assignment notification from the first storage processor, the identity assignment notification indicating each identifier together with an indication of each corresponding disk drive enclosure,
  evaluate the identity assignment notification to detect a state of the disk drive enclosures;
  evaluate, as part of a second batch process, the set of disk drive enclosures identified in the identity assignment notification relative to the set of identification rules;
  assign, as part of the second batch process, the corresponding identifier, as indicated in the identity assignment notification, to each disk drive enclosure that complies with the set of identification rules; and
  generate, as part of the second batch process, a fault notification for each disk drive enclosure that does not comply with at least one identification rule of the set of identification rules.

14. The disk processor of claim 13, wherein following assigning of the identifiers to each disk drive enclosure that complies with the set of identification rules the first storage processor is configured to store, as part of a storage batch process, each identifier together with an indication of each corresponding disk drive enclosure in a database.

15. The disk processor of claim 13, wherein following assigning of the identifiers to each disk drive enclosure that complies with the set of identification rules, the second storage processor is configured to store, as part of a storage batch process, each identifier together with an indication of each corresponding disk drive enclosure in a database.

16. The disk processor of claim 13, wherein, when evaluating the set of disk drive enclosures relative to the set of identification rules, the first storage processor is configured to evaluate, as part of the first batch process, active disk drive enclosures of the set of disk drive enclosures relative to the set of identification rules.

17. The disk processor of claim 13, wherein the first storage processor defines a set of bus ports, each bus port disposed in electrical communication with a subset of the set of disk drive enclosures, each bus port of the first storage processor and the subset of the set of disk drive enclosures disposed in electrical communication with each corresponding bus port defining a bus.

18. The disk processor of claim 17, wherein the second storage processor defines a set of bus ports, each bus port disposed in electrical communication with a subset of the set of disk drive enclosures, each bus port of the second storage processor and the subset of the set of disk drive enclosures disposed in electrical communication with each corresponding bus port defining a bus.

19. The disk processor of claim 13, wherein:
when evaluating the set of disk drive enclosures relative to a set of identification rules the first storage processor is configured to detect, as part of the first batch process, a disk drive enclosure disposed in electrical communication along a first bus of the storage processor as originating from a second bus of the storage processor;
when assigning the identifier to each disk drive enclosure that complies with the set of identification rules the first storage processor is configured to assign, as part of the first batch process, an identifier to the disk drive enclosure originating from the second bus of the storage processor when the disk drives of the disk drive enclosure are absent data; and
when generating a fault notification for each disk drive enclosure that does not comply with at least one identification rule of the set of identification rules, the first storage processor is configured to generate, as part of the first batch process, a fault notification for the disk drive enclosure originating from the second bus of the storage processor when at least one disk drive of the disk drive enclosure stores data.

20. A computer program product having a non-transient computer-readable medium including computer program logic encoded thereon that, when performed by a disk storage processor of a disk processor causes a first storage processor of the disk storage processor to:
  receive an instruction to assign each disk drive enclosure of the set of disk drive enclosures an identifier, each identifier providing a distinct identity to each disk drive enclosure in the system;
  evaluate, as part of a first batch process, the set of disk drive enclosures relative to a set of identification rules;
  assign, as part of the first batch process, an identifier to each disk drive enclosure that complies with the set of identification rules; and
  generate, as part of the first batch process, a fault notification for each disk drive enclosure that does not comply with at least one identification rule of the set of identification rules,
wherein the computer program product having the computer-readable medium including computer program logic encoded thereon, when performed by the disk storage processor of a disk processor causes a second storage processor of the disk storage processor to:
receive an identity assignment notification from the first storage processor, the identity assignment notification indicating each identifier together with an indication of and each corresponding disk drive enclosure,
evaluate, as part of a second batch process, the set of disk drive enclosures identified in the identity assignment notification relative to the set of identification rules;
assign, as part of the second batch process, the corresponding identifier, as indicated in the identity assignment notification, to each disk drive enclosure that complies with the set of identification rules; and
generate, as part of the second batch process, a fault notification for each disk drive enclosure that does not comply with at least one identification rule of the set of identification rules.

* * * * *

UNITED STATES PATENT AND TRADEMARK OFFICE
CERTIFICATE OF CORRECTION

| | | |
|---|---|---|
| PATENT NO. | : 8,260,974 B1 | Page 1 of 1 |
| APPLICATION NO. | : 12/978887 | |
| DATED | : September 4, 2012 | |
| INVENTOR(S) | : Gerry Fredette, Naizhong Chiu and Dhaval Patel | |

It is certified that error appears in the above-identified patent and that said Letters Patent is hereby corrected as shown below:

Title page, item [75]
Inventors: "Gary Fredette, Bellingham, MA (US); Naizhong Chiu, Newtown, MA (US); Dhaval Patel, Shrewsbury, MA (US)" should read --Gerry Fredette, Bellingham, MA (US); Naizhong Chiu, Newton, MA (US); Dhaval Patel, Shrewsbury, MA (US)--.

Signed and Sealed this
Fourth Day of December, 2012

David J. Kappos
*Director of the United States Patent and Trademark Office*